United States Patent
Ismail et al.

(10) Patent No.: US 8,829,214 B2
(45) Date of Patent: Sep. 9, 2014

(54) SUPERCRITICAL FLUID EXTRACTION PROCESS OF KENAF SEEDS

(75) Inventors: Maznah Ismail, Selangor Darul Ehsan (MY); Kim Wei Chan, Selangor Darul Ehsan (MY); Siti Aisyah Ghafar, Selangor Darul Ehsan (MY)

(73) Assignee: Universiti Putra Malaysia, Selangor Darul Ehsan (MY)

( * ) Notice: Subject to any disclaimer, the term of this patent is extended or adjusted under 35 U.S.C. 154(b) by 276 days.

(21) Appl. No.: 12/739,750

(22) PCT Filed: Aug. 7, 2009

(86) PCT No.: PCT/MY2009/000113
§ 371 (c)(1), (2), (4) Date: Jun. 6, 2011

(87) PCT Pub. No.: WO2010/064890
PCT Pub. Date: Jun. 10, 2010

(65) Prior Publication Data
US 2011/0224449 A1 Sep. 15, 2011

(30) Foreign Application Priority Data
Dec. 4, 2008 (MY) .............................. PI20084924

(51) Int. Cl.
*C11B 1/10* (2006.01)
*B01D 11/02* (2006.01)
*C11B 3/00* (2006.01)
*A61K 36/00* (2006.01)

(52) U.S. Cl.
CPC ................. *C11B 3/006* (2013.01); *C11B 1/104* (2013.01); *B01D 11/0203* (2013.01)

USPC ...... 554/11; 554/8; 554/12; 554/14; 424/776; 424/725

(58) Field of Classification Search
None
See application file for complete search history.

(56) References Cited

U.S. PATENT DOCUMENTS 4,466,923 A * 8/1984 Friedrich ........................ 554/8
5,516,923 A * 5/1996 Hebert et al. ................. 554/12

FOREIGN PATENT DOCUMENTS

| JP | 2005-87998 A | | 4/2005 | |
|----|--------------|---|--------|---|
| KR | 1020060093145 | * | 8/2006 | ............. A23D 9/007 |
| KR | 10-0783117 B1 | | 12/2007 | |
| KR | 10-0835710 B1 | | 6/2008 | |

OTHER PUBLICATIONS

KR 1020060093145, Extraction method for oil form grape seed using supercritical fluid extraction . . . , 2006, English Abstract, (2 pages).*
Beis, S., et al., Supercritical fluid extractin of Daphne (*Laurus nobilis* L.) seed oil, 2006, JAOCS, vol. 83, No. 11, pp. 953-957.*
Stahl, E. et al., Extractin of seed oils with liquid and supercritical carbon dioxide, 1980, J. Agric. Food. Chem. vol. 28, No. 6, pp. 1153-1157.*

(Continued)

*Primary Examiner* — Yate K Cutliff
(74) *Attorney, Agent, or Firm* — Crowell & Moring LLP

(57) ABSTRACT

The present invention provides a supercritical fluid extraction (SFE) process for extracting oil of kenaf seed (*Hibiscus cannabinus* L.), wherein the SFE process utilizes a supercritical fluid and is conducted in a pressure ranging from 200 to 600 bars with a temperature ranging from 40 to 80° C.

11 Claims, 3 Drawing Sheets

(56) References Cited

OTHER PUBLICATIONS

Gomez, A.M. et al., Caracterizacion del aceite de semilla de va extraido con dioxido de carbono supercritico, 1995, Grasas y Aceites, vol. 46, issue 1, pp. 29-34.*

Mohamed, A.. et al., Chemical composition of kenaf (*Hibiscus cannabinus* L.) seed oil, 1995, Industrial Crops and Products, vol. 4, pp. 157-165.*

Gomez, A. et al., Recovery of grape seed oil by liquid and supercritical carbon dioxide extractin:a comparison with conventinal solvent extraction, 1996, The chemical engineering journal, vol. 61, pp. 227-231.*

Pistacchio, F., Natural Fibers, 2008, Namateco, pp. 1-3.*

Devasgayam, TPA, et al., Free radicals and antioxidants in human health: Current status and future prospects, 2004, JAPI, vol. 52, pp. 794-804.*

Kamal-Eldin, A. et al., The chemistry and antioxidant properties of Tocopherols and Tocotrienols, 1996, Lipids, vol. 31, No. 7, pp. 671-701.*

International Search Report dated Feb. 2, 2010 (Two (2) pages).

* cited by examiner

SUPERCRITICAL FLUID EXTRACTION PROCESS OF KENAF SEEDS

This application is a national stage of PCT/MY2009/000113, filed Aug. 7, 2009, which claims priority under 35 U.S.C. §119 to PI 20084924, filed Dec. 4, 2008, the entire disclosure of which is herein expressly incorporated by reference.

FIELD OF INVENTION

The present invention provides a supercritical fluid extraction of kenaf seeds.

BACKGROUND OF INVENTION

*Hibiscus cannabinus* L. (kenaf) is a biennial and short-day herbaceous plant cultivated for soft bast fiber in the stem. It belongs to the family of Malvaceae, which is notable for economic and horticultural importance. Kenaf possessed a long history of cultivation in India, Bangladesh, Thailand, parts of Africa, and to a small extent in southeast Europe. Grown over 4000 years in Africa, different parts of kenaf tree have been served as the sources of food, animal diet, handicraft making and fuel to the local communities. Several species are found growing widely in many countries. At the present, principal farming areas are throughout China, India and many other countries including Mackay, Australia; Texas, USA (seed farms) and Tamaulipas, Mexico.

In Malaysia, kenaf is receiving an increasing attention from manufacturers due to its broad applications in fiber board, biocomposite materials and high protein animal feed makings. Malaysian government is interested to cultivate kenaf as the fourth industrial crop in the nation in order to replace tobacco plantation and achieve agricultural diversification. Researches on kenaf production in Malaysia were initiated in early 2000 and first kenaf seed production undertaking was carried out in Serdang, Selangor. However, the cultivation of kenaf in Malaysia is still at experimental stage and the plant is still not optimally utilized by the industry. For instance, kenaf seeds that contain considerable oil content with possible nutraceutical values are disposed as waste material during the harvesting or processing of kenaf.

Physically, kenaf seeds are relatively small (6 mm long×4 mm wide), slate-black in color and triangular in shape with acute angles. Kenaf varieties produce a number of seeds that range from 36,000 to 40,000 seeds/kg. The yield of kenaf seeds is highly dependent on the variety and cultivating location of the seed. In Malaysia, the seed yield is only approximately 700 kg/ha at present. If the consistent seeds yield of 1500 kg/ha could be obtained, kenaf might be a profitable oilseed crop on the basis of 20% oil extraction.

Oil composition of kenaf seed is very similar to cottonseed except for the presence of gossypol (a toxic phenolic pigment) in cottonseed oil. Kenaf seed oil (extracted by Soxhlet extraction) is high in unsaturated fatty acids (76.0%-81.5%) with linoleic acid ($C_{18:2}$) being the predominant fatty acid (45.9%) in the oil. Besides, kenaf seed oil is also high in phospholipids and phytosterols (6.0% and 0.9% of the oil, respectively). Owing to the considerable oil content and unique composition of kenaf seed oil, it has been suggested in the prior art that kenaf seed oil may present as an alternative and economical source of edible oil for human consumption.

However, oils that are extracted by using organic solvents such as n-hexane or petroleum ether are always doubted for its safe consumption. Hence, supercritical carbon dioxide fluid extraction (SFE) seems to be a good solution in this scenario. SFE offers the usage of non-toxic, non-explosive, environmental friendly, cost effective, time saving and selectivity-adjustable solvent (supercritical carbon dioxide fluid) in the extraction advantageously. Moreover, it also enables the oil extraction to be carried out at low temperatures and complete removal of solvent at the final stage of the extraction.

SUMMARY OF INVENTION

Accordingly, the present invention provides a supercritical fluid extraction (SFE) process for extracting oil of kenaf seed (*Hibiscus cannabinus* L.), wherein the SFE process utilises a supercritical fluid and is conducted in a pressure ranging from 200 to 600 bars with a temperature ranging from 40 to 80° C.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Figure 1:
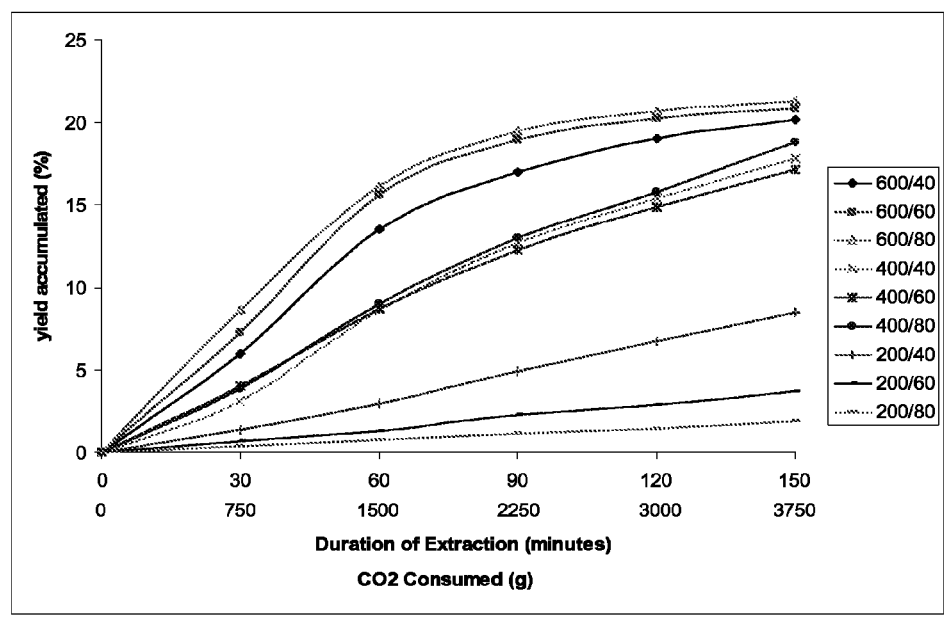
FIG. 1 shows the yield of kenaf seed oils through different SFE extraction parameters.

The present invention provides a supercritical fluid extraction of kenaf seeds. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

Example 1

Kenaf Seed (Qui Ping 3) Extractions a. Preparation of Dried Kenaf Seeds

Kenaf seeds (variety: Qui Ping 3) were cleaned and dried to constant weight at 50° C. in oven (FD 115, Fisher Scientific, Loughborough, Leicestershire, UK). Subsequently after drying, kenaf seeds were stored at 4° C. prior to extractions.

b. Supercritical Carbon Dioxide Fluid Extraction (SFE)

Kenaf seeds were extracted by using Supercritical Carbon Dioxide Extractor (Thar 1000 F, Thar Technologies, Inc., Pittsburgh, Pa., USA) at 9 different extraction parameters (pressure (bars)/temperature (° C.): 600/40; 600/60; 600/80; 400/40; 400/60; 400/80; 200/40; 200/60; 200/80). Briefly, one hundred grams of kenaf seed was ground by Waring blender for one minute and placed into a 1 liter extraction vessel. After the extraction vessel was tightly sealed, the desired extraction temperature was set. Pressure within the extraction vessel was built up with a constant carbon dioxide flow rate (25 g/min) and regulated by automated back pressure regulator. The SFE extraction was initiated after the desirable temperature and pressure were achieved. The entire extraction process lasted for 150 minutes and the yield of the oil was measured after every interval of 30 minutes. After the extraction was completed, the extraction vessel was depressurized and the oil was collected from the collection vessel. The total oil obtained from the extraction was calculated through the accumulation of interval yields.

c. Soxhlet Extraction

Fifty grams of kenaf seed was ground by Waring blender for one minute and equally divided into two extraction thimbles. Each thimble was then transferred into a Soxhlet extractor (Witeg-Labortechnik GmbH, Wertheim, Germany). Approximately, 300 ml of n-hexane (Fisher Scientific, Loughborough, Leicestershire, UK) was added into each flask, which was connected to the extractor and condenser. After extractions were initiated, the solvent flow rates were adjusted manually to 7 minutes/cycle. Finally, extraction process was terminated after 20 cycles (rapid Soxhlet extraction, SOX/S) and 100 cycles (classic Soxhlet extraction, SOX/L), respectively. After extractions were completed, n-hexane was removed at 50° C. under reduced pressure using rotary evaporator (Rotavapor R210, Buchi, Postfach, Flawil, Switzerland). Subsequently after the evaporation, the flasks were placed into a desiccator chamber for one hour. The oils obtained were weighed and the yields were calculated.

d. Conventional Ultra-Sonic Assisted Solvent Extraction (SONIC)

Twenty five grams of kenaf seeds was ground and homogenized with 300 ml n-hexane (Fisher Scientific, Leicestershire, UK) at 13 500 rpm for 3 minutes (Ultra-turax T25 basic, IKA®-WERKE GmbH & Co. KG, Staufen, Germany). Then, the mixture was sonicated (high frequency setting) for 90 minutes in a ultrasonic bath (Power sonic 505, HwaShin Technology Co., Seoul, Korea). After the sonication, the mixture was filtered through filter paper (Whatman No. 1) and the residue was re-extracted according to the same procedure. Finally, the filtrates were pooled and evaporated using rotary evaporator (Rotavapor R210, Buchi, Postfach, Flawil, Switzerland). The yield of the oil was calculated after the flask was cooled in a desiccator chamber for one hour.

FIG. 1 shows the yield of kenaf seed oils through nine different SFE extraction parameters. In general, kenaf seed oil yielded from 2.12% to 20.18% after 150 minutes of SFE extraction with carbon dioxide consumption of 3.75 kg. Apparently, a rise in extraction pressure increases the yield of kenaf seed oil according to the following sequence: 600/80≥600/60≥600/40≥400/80≥400/40≥400/60≥200/40≥200/60≥200/80 ($P<0.05$). Besides increasing the oil yield, a rise in extraction pressure is also found to accelerate the extraction process.

According to the extraction trends showed in FIG. 1, extractions that were done at 600 bars reached "plateau" after 60 to 90 minutes whereas at 400 bars, "plateau" stage were only observed after 90 to 120 minutes of extraction. No "plateau" stage was observed in the extraction process at 200 bars as the yield of the oil was found to be significantly and continuously increased after every interval of 30 minutes until the end of the experiment. In this study, extraction temperature does not play a very crucial role in influencing the yield of the oil if the SFE extraction is conducted at high and intermediate extraction pressures (600 bars and 400 bars) ($P>0.05$). However, at low extraction pressure (200 bars), a rise in extraction temperature decreases the oil yield obtained significantly ($P<0.05$).

For solvent extraction, SOX/L, SOX/S and SONIC yielded 24.81%±0.32, 22.40%±0.72 and 21.08%±0.001, respectively. SOX/L gave highest yield in solvent extraction followed by SOX/S and SONIC ($P<0.05$). This indicates that heat treatment is more efficient in assisting kenaf seed oil extraction as compared to homogenization followed by sonication. Besides, prolong Soxhlet extraction duration also increases the oil yield obtained. Oil content of kenaf seed obtained from solvent extractions in this study is falling within the range of kenaf seed oil yield (21.64% to 26.4%).

In comparison with SFE extractions, SOX/L yielded higher oil content (24.81%) than SFE extractions at all extraction parameters (2.12% to 20.18%). However, the rise of few percents in oil yield by SOX/L is not economically beneficial as it consumed more than 12 hours to accomplish the entire extraction process in comparison with 150 minutes by SFE. No significant differences in yield were observed between kenaf oils that were extracted at 600 bars, SOX/S and SONIC ($P>0.05$). This indicates that SFE extraction at high pressure may serve as an excellent alternative method in kenaf seed oil extraction due to its solvent-free, time saving (comparing to SOX/L) and environmental friendly characteristics.

Example 2

Antioxidant Activities of Kenaf Seed Oils (Qui Ping 3) in Comparison to 7 Types of Commercial Cooking Oils a. DPPH Free Radical Scavenging Activity Anti-radical scavenging activity of kenaf seed and commercial edible oils (palm olein (FFM Berhad, Sungai Buloh, Selangor, Malaysia), Mazola corn oil, Mazola soy bean oil, Mazola canola oil, Mazola sunflower seed oil (ACH Food Companies, Inc., 10 Cordova, Tenn., USA, USA), rice bran oil (Amornchai Co. Ltd., Bangrak, Bangkok, Thailand), pure olive oil (80% refined olive oil & 20% extra virgin olive oil) (Basso Fedele e figli s.r.l., San Michele di Serino, Italy)). were measured according to the method described by Ramadan, Kroh and Morsel (2003) with slight modification. α-tocopherol (Sigma-Aldrich Co., St. Louis, Mo., USA) was used as the standard lipophilic antioxidant in this test. In brief, 0.1 ml of toluenic sample solution at different concentrations was added with 0.39 ml of fresh toluenic DPPH (2,2-diphenyl-1-picrylhydrazyl) solution (0.1 mM) (Sigma-Aldrich Co., St. Louis, Mo., USA). Then, the mixture was shaken vigorously and left in darkness for 60 minutes. Finally, the absorbance of the mixture was measured against pure toluene (blank) at 515 nm by using a UV-Visible 20 spectrophotometer (Pharmaspec uv-1700, Shimadzu, Kyoto, Japan).

Antiradical activity of kenaf seed and commercial edible oils were estimated from the following equition:

$$\% \text{ Inhibition} = ([A_{control} - A_{sample}]/A_{control}) \times 100$$

whereby $A_{blank}$=Absorbance of the control reaction (containing all reagents except samples)

$A_{sample}$=Absorbance of the test compound

Inhibition concentration fifty values ($IC_{50}$) of the sample was expressed in mg/ml and calculated through the interpolation of linear regression analysis. $IC_{50}$ in this test was defined as the concentration of the oil that able to inhibit 50% of the total DPPH free radicals.

b. Beta-Carotene Bleaching (BCB) Assay

Beta-carotene bleaching (BCB) assay for kenaf seed and commercial edible oils were determined according to the protocol described by Kumazawa et al. (2002). α-tocopherol was used as the standard lipophilic antioxidant in this test. In brief, 3 ml of beta-carotene solution (100 μg/ml chloroform) (Sigma-Aldrich Co., St. Louis, Mo., USA) was added to 40 mg of linoleic acid (Sigma-Aldrich Co., St. Louis, Mo., USA) and 400 mg of Tween 20 (Fisher Scientific, Loughborough, Leicestershire, UK). Then, the mixture was mixed well and dried under nitrogen stream. Immediately, 100 ml of distilled water was added to the dried mixture to form a beta-carotene/linoleic emulsion. One and half milliliters of emulsion were added with 20 μl of methanol (control) or sample at the concentration of 5 mg/ml methanol. After that, the sample was incubated in water bath at 50° C. for one hour. Finally, the absorbance of the sample was measured at 470 nm against distilled water (blank) by using a UV-Visible spectrophotometer (Pharmaspec uv-1700, Shimadzu, Kyoto, Japan).

Percentage of antioxidant activity (% AA) of the sample was calculated using this formula:

$$\% AA = 100(DR_{control} - DR_{sample})/DR_{control}$$

whereby,

DR=Degradation rate; (a/b)/60
a=Absorbance$_{470nm}$ of the sample before incubation
b=Absorbance$_{470nm}$ of the sample after incubation
$DR_{control}$=Degradation rate of the control sample
$DR_{sample}$=Degradation rate of tested sample Antioxidant activity of kenaf seed and commercial edible oils in this study were expressed in mg α-tocopherol equivalent (Teq)/g oil sample.

Figure 2:
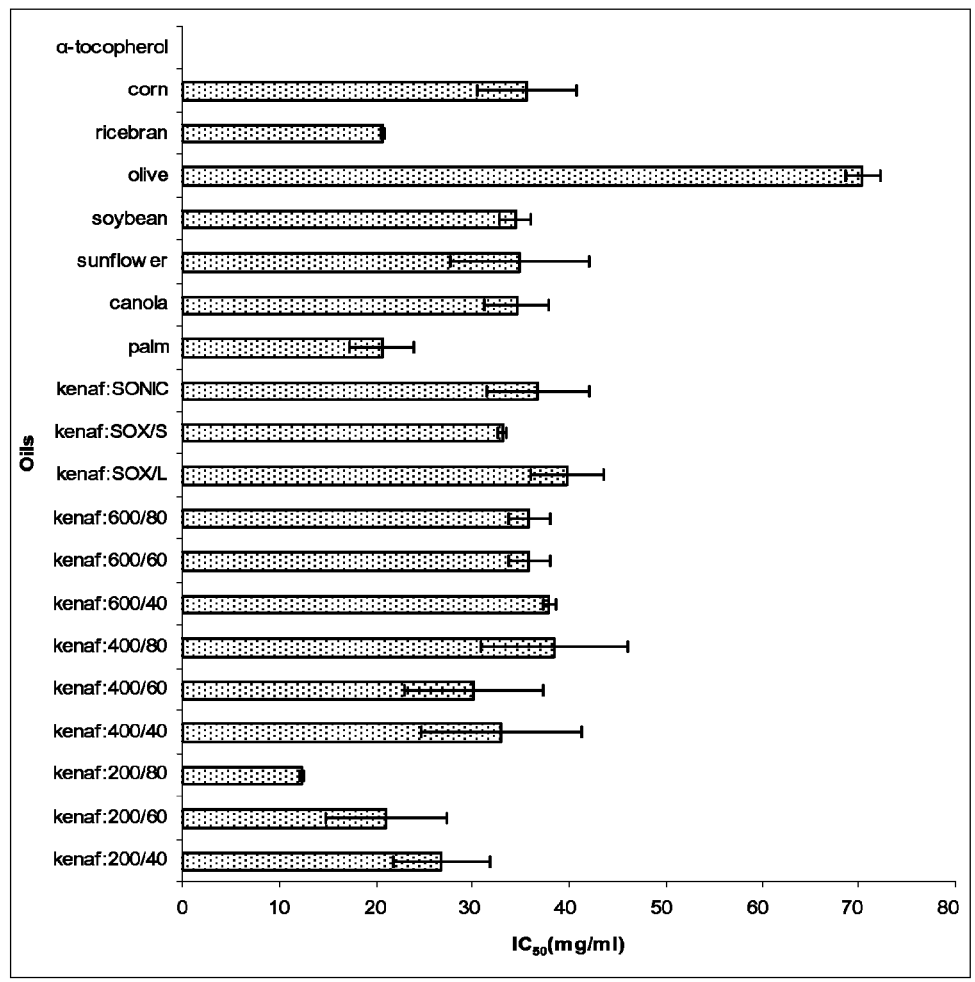
FIG. 2 shows the $IC_{50}$ values of kenaf seed oils and commercial edible oils through DPPH scavenging activity.

$IC_{50}$ values of kenaf seed oils and commercial edible oils through DPPH scavenging activity are presented in FIG. 2. In general, $IC_{50}$ values for kenaf seed oils ranged from 12.27 mg/ml to 39.80 mg/ml whereas for commercial cooking oils, the range was from 20.59 mg/ml to 70.43 mg/ml. SFE kenaf oil that was extracted at 200/80 exhibited highest antiradical activity (P<0.05) as compared to all tested samples. In contrast, olive oil possessed weakest antiradical activity (P<0.05). This result confirms that olive oil is one of the weakest samples in DPPH antiradical activity among 10 tested vegetable oils. Palm kernel oil and rice bran oil were found to be the samples that possessed highest antiradical activity (P<0.05) among commercial cooking oil probably due to the level of fatty acids unsaturation and antioxidants content (such as tocopherol, tocotrienol and gamma-oryzanol). The order of effectiveness of oils in inhibiting DPPH free radicals is as followed: kenaf:200/80>palm≥rice bran≥kenaf:200/60≥kenaf:200/40≥kenaf:400/60≥kenaf:400/40≥kenaf:SOX/S≥soy≥canola≥sunflower≥corn≥kenaf:600/60≥kenaf:600/80≥kenaf:SONIC≥kenaf:600/40≥kenaf:400/80≥kenaf:SOX/L>olive (P<0.05). Kenaf seed oils that were extracted by SFE above 400 bars exhibited similar antiradical activity with solvent-extracted kenaf seed oils and most of the commercial cooking oils except for palm oil, rice bran oil and olive oil (P>0.05). However, these commercial edible oils are added with synthetic antioxidants like BHA, BHT and TBHQ during processing. Thus, kenaf seed oil might actually possess better antiradical activity if compared with these commercial cooking oils and it can potentially serve as functional cooking oil.

Figure 3:
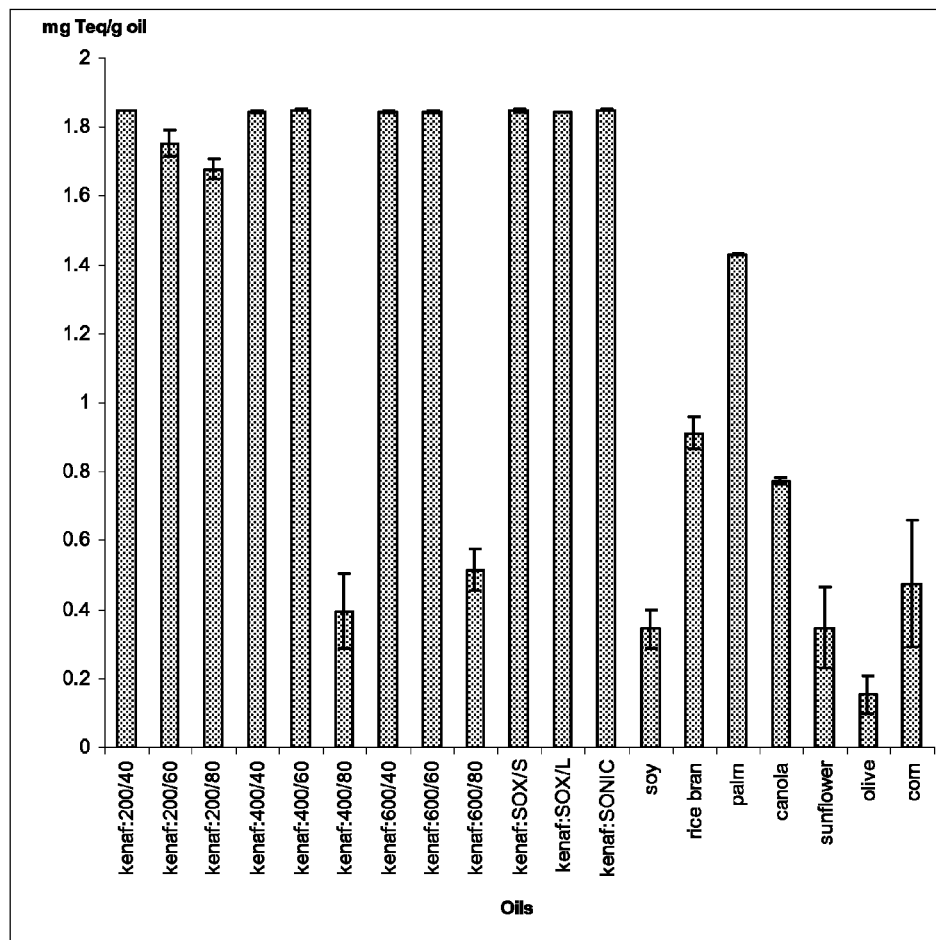
FIG. 3 shows the antioxidant activity of kenaf seed oils and commercial edible oils through BCB assay.

FIG. 3 shows antioxidant activity of kenaf seed oils and commercial cooking oils through BCB assay. Antioxidant activity of the samples were calculated through interpolation α-tocopherol standard curve (y=9841.8x−3.1626; $r^2$=0.9801) and expressed in mg Teq/g oil. In general, antioxidant activity of studied samples ranged from 0.15 mg Teq/g oil to 1.85 mg Teq/g oil. Contradictory to DPPH test, extraction temperature seemed to be the crucial factor determining the antioxidant activity of SFE kenaf seed oils in BCB assay. Increased extraction temperature to 80° C. under extraction pressures of 400 bars and 600 bars result in tremendous fall in antioxidant activity (P<0.05). For kenaf seed oils that were extracted under 200 bars, the antioxidant activity of the samples reduced gradually in correspondence to the rise in temperature (P<0.05). Possible reason explaining this result is kenaf seed oils that are extracted at high pressure and temperature might contain antioxidant properties which are susceptible to thermal degradation. Owing to that reason, these samples might exhibit good antioxidant activity in thermal-free DPPH test but show paradoxical result in BCB assay. Besides, less reactivity of antioxidants in high temperature-extracted kenaf seed oil towards linoly radicals (e.g. peroxyl and alkyl radicals) compared to DPPH radical might also be a possible reason to explain this scenario as the scavenging activity of the DPPH is largely depending on the stearic accessibility of the antioxidant to the radical reaction site (Prior, Wu and Schaich 2005). However, according to Lim and Quah (2007), the results in the BCB assay cannot be correlated to those from the DPPH radical scavenging assay due to the different reaction system.

In BCB assay, palm oil and olive oil respectively represented sample with strongest and weakest antioxidant activity among 7 types of tested commercial edible oils (P<0.05). In comparison with commercial edible oils, almost all kenaf oil samples (except for kenaf: 400/80 and 600/80) exhibited higher antioxidant activity as compared to commercial edible oils, although most of the commercial oils are supplemented with synthetic antioxidants (P<0.05). No significant difference in antioxidant activity is observed between most of the SFE-extracted (except for 200/60; 200/80; 400/80 and 600/80) and solvent-extracted kenaf seed oils (P>0.05). This indicates that SFE able to replace organic solvent in extracting kenaf seed oil that possesses powerful antioxidant activity toward thermal-induced linoleic acid peroxidation as compared to commercial edible oils.

Example 3

Oil Extractions and Antioxidant Activities Evaluation of V 36 Kenaf Seed a. Preparation of Dried Kenaf Seeds Kenaf seeds (variety: V36) were cleaned and dried to constant weight at 40° C. in oven (FD 115, Fisher Scientific, Loughborough, Leicestershire, UK). Subsequently after drying, kenaf seeds were stored at 4° C. prior to extractions.

b. Supercritical Carbon Dioxide Fluid Extraction (SFE)

Kenaf seeds were extracted by using Supercritical Carbon Dioxide Extractor (Thar 1000 F, Thar Technologies, Inc., Pittsburgh, Pa., USA) at the optimum extraction parameters (pressure (bars)/temperature (° C.): 600/40 and 600/60) according to the method as described in Example 1 (b) The total oil obtained was calculated after 150 minutes of extraction.

c. Conventional Ultra-Sonic Assisted Solvent Extraction (SONIC)

Solvent extraction of V 36 kenaf seed was conducted according to the method as described in Example 1 (d).

d. Determination of Total Phenolic Content

Purification process of kenaf seed oils was done according the method described by Ramadan et al. (2003). In brief, two grams of sample were dissolved in n-hexane (5 ml) and mixed with 10 ml of methanol-water (80:20, v/v) in a glass tube for 2 min in a vortex. After centrifugation at 3000 rpm for 10 min, the hydroalcoholic extracts were separated from lipid phase by using a Pasteur pipette. After that, the hydroalcoholic extract were pooled and concentrated in reduced pressure at 50° C. (Rotavapor R210, Buchi, Postfach, Flawil, Switzerland) until a syrup consistency was reached. Hydroalcoholic extract were redissolved in acetonitrile (15 ml) and the mixture was washed three times with n-hexane (15 ml each).

and 150 μl $H_2O_2$ (Bendosen Laboratory Chemicals, Bendosen, Norway) (2 mM). The condition of ESR was: center field: 336.45±5; power: 8 mw; Mod width: 0.1 mT; sweep time: 2 min; time constant: 0.1 second; amplitude: 160; modulation frequency: 100 kHz. The hydroxyl radical scavenging activity of kenaf oils was expressed in g DMSO (Fisher Scientific, Loughborough, Leicestershire, UK) equivalent/g sample (g DMSOE/g sample) (Thomsen et al., 2000).

| Kenaf Oil | Yield (%, w/w) | Total Phenolic Content (mg GAE/g Sample) | DPPH Scavenging Activity | | Hydroxyl Radical Scavenging Activity (g DMSOE/g sample) |
|---|---|---|---|---|---|
| | | | mg Teq/g sample | mg AAeq/g sample | |
| SFE 600/40 | 13.05 ± 0.26 | 0.011 ± 0.004 | 0.594 ± 0.091 | 0.431 ± 0.028 | 2.052 ± 0.504 |
| SFE 600/60 | 14.31 ± 0.55 | 0.008 ± 0.000 | 0.481 ± 0.063 | 0.484 ± 0.135 | 1.448 ± 0.412 |
| Hexane | 16.60 ± 0.18 | 0.017 ± 0.003 | 0.476 ± 0.224 | 0.395 ± 0.070 | 3.349 ± 0.228 |

Purified fractions in acetonitrile were concentrated under reduce pressure at 50° C. (Rotavapor R210, Buchi, Postfach, Flawil, Switzerland) then dissolved in methanol for total phenolic content analysis Total phenolic content in kenaf seed oils was determined according to the method of Singh et al. (2002). Exactly 100 mg of extract were dissolved in 10 ml of methanol. Half milliliter aliquots were added to 2.5 ml Folin-Ciocalteu reagent (Sigma-Aldrich Chemie GmbH, Buchs, Switzerland) respectively before mixed it with 2 ml of 7.5% $Na_2CO_3$ (Sigma-Aldrich Co., St. Louis, Mo., USA). The mixtures were mixed well and incubated at 40° C. for 30 minutes. The absorbance of the samples was measure spectrophotometrically (Pharmaspec uv-1700, Shimadzu, Kyoto, Japan) at 760 nm Total phenolic content of sample was determined through gallic acid (Sigma-Aldrich Chemie GmbH, Buchs, Switzerland) standard curve and expressed in mg of gallic acid equivalent/g sample (GAE/g sample).

e. DPPH Free Radical Scavenging Activity

The DPPH radical-scavenging assay was carried out according to the method described by Ramadan et al. (2003) with slight modification. In brief, 0.39 ml of 0.1 mM DPPH (Sigma-Aldrich Co., St. Louis, Mo., USA) ethanol solution was reacted with 0.1 ml sample extract at various concentration at room temperature. The mixture was shaken vigorously and allowed to stand 60 min in the dark. The reading was taken by using electron spin resonance (ESR) (JEOL FA100, Jeol Ltd, Tokyo, Japan) at the following condition: modulation frequency: 100 kHz; Center field: 336.734 mT±5; sweep time: 1 min; power: 8 mW; mod width: 0.2 mT; time constant=0.15 second; amplitude: 160. Ascorbic acid (Sigma-Aldrich Chemie GmbH, Steinheim, Germany) and α-tocopherol (Sigma-Aldrich Co., St. Louis, Mo., USA) were used as standards in this test. DPPH scavenging activity of kenaf seed oils was expressed in mg α-tocopherol equivalent/g sample (mg Teq/g sample) and mg ascorbic acid equivalent/g sample (mg AAeq/g sample)

f. Hydroxyl Scavenging Activity Test

Hydroxyl scavenging activity test were performed in a quartz flat cell using ESR (JEOL FA100, Jeol Ltd, Tokyo, Japan). Reactions were started approximately 2 minutes after mixing 40 μl DMPO (Labotec Ltd., Tokyo, Japan) (400 mM), 37.5 μl $FeSO_4$ (BDH Chemicals Ltd., Poole, England) (0.4 mM), 112.5 μl EDTA (Sigma-Aldrich, Inc., St. Louis, Mo., USA) (0.1 mM), 60 μl samples (at various concentrations)

Table 1 shows the total phenolic content, DPPH scavenging activity and hydroxyl radical scavenging activity of V36 kenaf seed oils. The yield, total phenolic content, DPPH scavenging activity and hydroxyl radical scavenging activity of V36 kenaf seed oils ranged from 13.05 to 16.60%, 0.008 to 0.017 mg GAE/g sample, 0.481 to 0.594 mg Teq/g sample and 0.395 to 0.484 mg AAeq/g sample as well as 1.448 to 3.349 DMSOE/g sample, respectively. Hexane extraction showed higher yield than both SFE extractions (P<0.05). A rise in extraction temperature from 40 to 60° C. under isobaric condition (600 bars) slightly improves the oil yield of V 36 kenaf seed (P<0.05).

This result is in agreement with the finding on SFE extraction of Quipping 3 kenaf seed (Example 1 e). However, result also indicates that V36 kenaf seed has lower oil content as compared to Qui Ping 3. Oil yield of V36 kenaf seed from hexane, SFE 600/40 and SFE 600/60 extractions are lower than Qui Ping 3 by 21.3%, 35.3% and 31.4%, respectively. Hexane extraction improves the phenolic content and hydroxyl radical scavenging activity of V36 kenaf seed oil as compared to SFE extractions (P<0.05).

Besides that, these results also indicate that there is no significant difference in total phenolic content and antioxidant activities (DPPH and hydroxyl radical scavenging activities) if the SFE extraction temperature is rose from 40 to 60° C. under isobaric condition (600 bars) (P>0.05). This result is in agreement with the finding on DPPH scavenging activity of Quipping 3 kenaf seed oils (Example 2 c). No significant difference was found between samples in DPPH scavenging activity test (P>0.05)

The invention claimed is:

1. A supercritical fluid extraction (SFE) process to extract kenaf seed oil (*Hibiscus cannabinus* L.) having a phenol content from kenaf seeds, comprising:
   exposing ground kenaf seeds to supercritical fluid at a temperature range of 40° C.-80° C. and a pressure range of 200-600 bars, wherein the supercritical fluid is carbon dioxide and the flow rate of carbon dioxide is 25 g/min.

2. The SFE process as claimed in claim 1, wherein the carbon dioxide consumption ranges from 0.025 to 3.75 kg.

3. The SFE process as claimed in claim 1, wherein the kenaf seed is selected from a variety comprising Qui Ping 3 and V36.

4. The SFE process as claimed in claim 1, wherein the process is conducted at a temperature of 40° C. and a pressure of 600 bars.

5. The SFE process as claimed in claim 1, wherein the process is conducted at a temperature of 60° C. and a pressure of 600 bars.

6. The SFE process as claimed in claim 1, wherein the process is conducted at a temperature of 80° C. and a pressure of 600 bars.

7. The SFE process as claimed in claim 1, wherein an oil yield obtained from SFE is higher than an oil yield obtained from solvent extraction, wherein the solvent used is n-hexane, after 150 minutes.

8. The SFE process as claimed in claim 7, wherein the SFE process extracts kenaf seed oil under a solvent-free condition.

9. The process as claimed in claim 1, wherein the extracted kenaf seed oil exhibits antioxidant activity that is equivalent to 0.4 to 2 mg of $\alpha$-tocopherol per gram of kenaf seed oil.

10. The process as claimed in claim 9, wherein the kenaf seed oil extracted at 200 bars exhibits higher antiradical activity than kenaf seed oils extracted at 400 and 600 bars.

11. The process as claimed in claim 9, wherein the kenaf seed oil obtained from SFE exhibits antiradical activity that is 2 to 3 folds higher than solvent extracted kenaf seed oil.

* * * * *